April 15, 1947.    C. W. STRATFORD ET AL    2,418,857
PROCESS OF PERFORMING CATALYTIC VAPOR PHASE REACTIONS
Filed Nov. 10, 1943    2 Sheets-Sheet 1
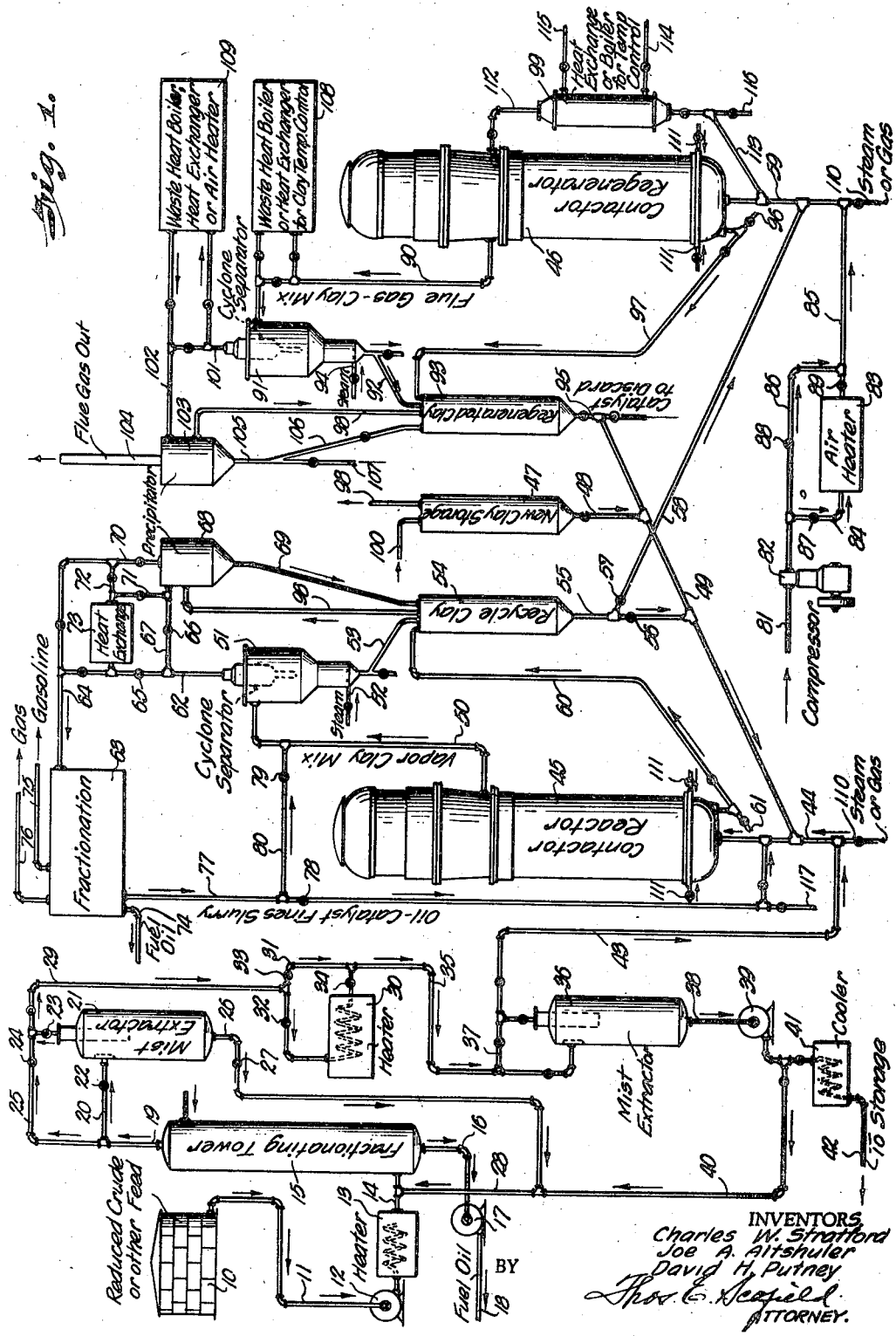
INVENTORS
Charles W. Stratford
Joe A. Altshuler
David H. Putney
BY Thos. E. Scofield
ATTORNEY.

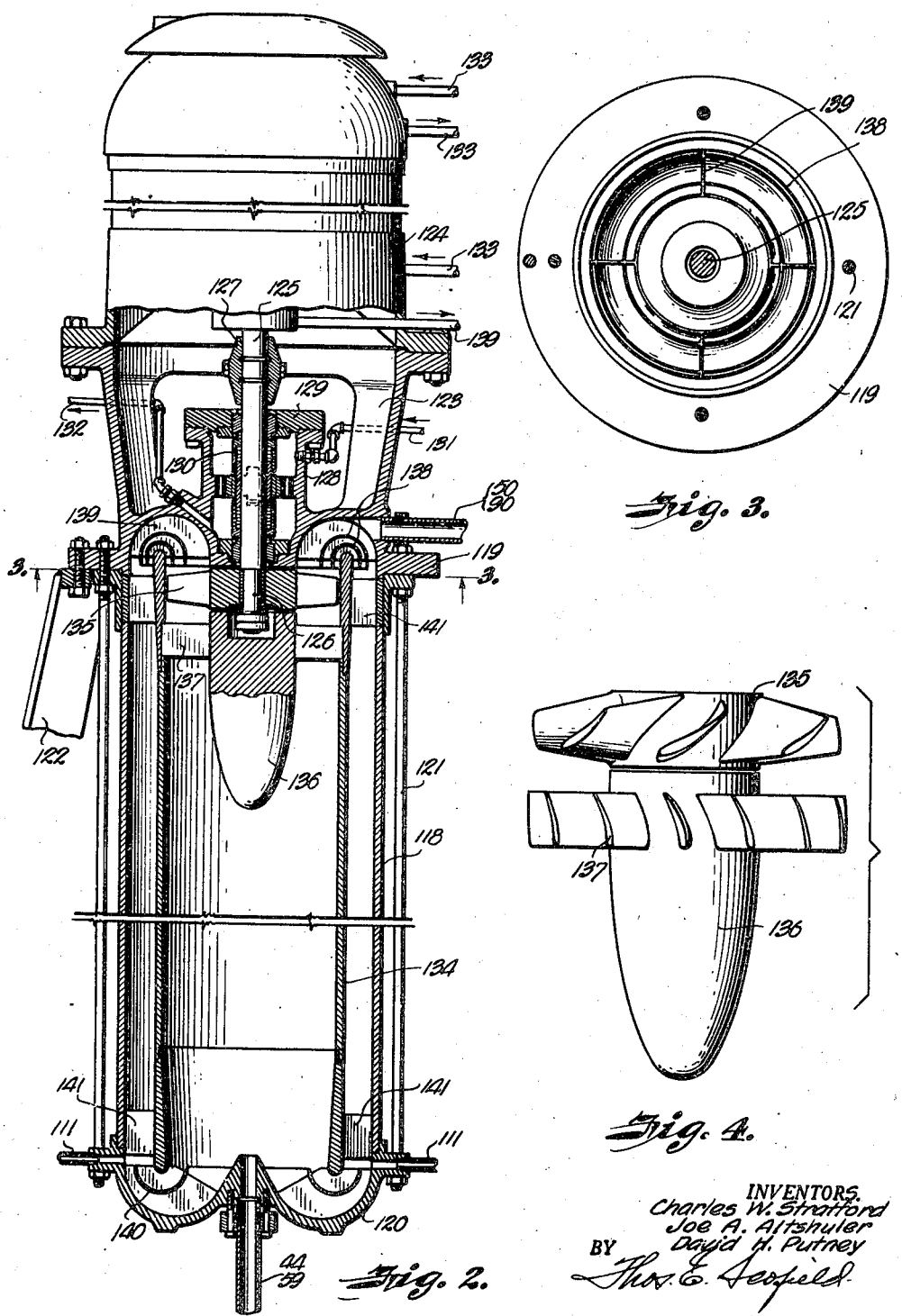

Patented Apr. 15, 1947

2,418,857

UNITED STATES PATENT OFFICE 2,418,857

PROCESS OF PERFORMING CATALYTIC VAPOR PHASE REACTIONS

Charles W. Stratford, Joe A. Altshuler, and David H. Putney, Kansas City, Mo., assignors to Stratford Development Corporation, Kansas City, Mo., a corporation of Delaware Application November 10, 1943, Serial No. 509,702

2 Claims. (Cl. 196—52)

Our invention relates to improvements in catalytic gaseous or vapor phase reactions and refers more particularly to catalytic reactions performed in cyclic steps of a process including reaction and regeneration stages.

The process is not limited to the reaction or conversion of any particular materials but is adaptable to any catalytic process wherein the materials undergoing reaction are maintained in the vapor phase and are brought in intimate contact with a solid catalyst. By way of illustration, but not in a limiting sense, examples of such processes are the catalytic conversion or cracking of petroleum hydrocarbons as well as hydrogenation, dehydrogenation, isomerization, polymerization, aromatization and desulfurization of hydrocarbons in which the instant process may be used.

In processes involving catalytic chemical reactions metals or metals in combination with other catalysts may be required while in processes involving the conversion of hydrocarbons natural or synthetic clays may be used. The size of the catalyst will be selected according to the conditions maintained including the velocity of travel of the reactants, porosity of the particles and other factors which will affect contact between the fluid and solids in the mixture.

In brief, the salient features of novelty in the process as applied to catalytic cracking reside primarily in imparting velocity to the mixture of gaseous reactants and catalyst entirely independent of the energy supplied by the feed of said materials to the reaction or regenerating steps. By this independent control over the velocity a more homogeneous and uniform mixture of the particles of catalyst and reactants is obtained than by relying upon energy furnished by pumps or reduction of pressure of the feed.

A further feature of novelty is the control obtained over the ratio of catalyst to reactants by recirculation of unregenerated catalyst to the reaction step. An additional feature is the establishment of separate cyclic zones, a reaction zone, where a homogeneous mixture of catalyst and fluid reactants is created, a regenerating zone where a stream of contaminated catalyst and combustible or oxidizing gas exists, and maintaining uniformity and homogeneity in the separate zones or cyclic streams by means of a positive mechanical rotor or impeller which maintains the suspended particles of the catalyst dispersed throughout the gaseous media in which it is suspended.

It is known that heretofore the importance of intimacy of contact and homogeneity of dispersion has been appreciated, but conditions of mixture have always been dependent upon energy supplied through the feed to the reactor or regenerator to obtain effective contact and dispersion.

In contrast thereto there is here provided a system and process in which the velocity of the circulating streams governs the completeness of dispersion or extent of contact of the fluid and solid particles and this velocity is entirely independent of the energy supplied through the agency of the feeds to the reactor or regenerator.

Attempts have been made to control the ratio of catalyst to reactants by the feed rate of the components and in some cases a reduction in ratio was obtained by bleeding a portion of the catalyst from the cycle. Insofar as is known, however, no provision has ever been made for increasing the ratio of the catalyst and reactants above the ratio established by the feed.

There are indications that particularly in the conversion of hydrocarbons, that elimination of liquid particles in the feed reduces to a great extent excessive and rapid carbon formation and contamination of the catalyst particles.

An accurate control of the degree of contamination can be had by recycling selected amounts of regenerated and unregenerated catalyst. It has been found that a certain degree of catalyst fouling is in some instances advantageous.

Rapid circulation and intimate contact of the reactants and catalyst and even distribution of the catalyst throughout the stream of reactants or throughout the stream of regenerating gas permits the use of optimum temperatures in the reactor and regenerator. In the conversion of hydrocarbons temperature conditions may be more accurately controlled due to uniformity of distribution of the catalyst and reactants and the resultant product more definitely predicted. Intimate contact and uniform dispersion obtained by energizing the streams of suspended catalyst independently of the feed in the reactor and regenerator exposes considerably more catalytic surface to the reactants and combustion gases and eliminates dead spots in both stages.

By the present method the residence time of the catalyst and reactants in the reaction stage is the same while in present commercial catalytic methods the replacement of the catalyst has never corresponded or approximated the same frequency as the change of the reactant. The process affords catalyst within the reactor in a more uniform and constant state of activity than in catalytic methods where a static bed or a moving bed are used. Obviously too, only in systems where the residence time of the catalyst and the reactants is the same can the activity of the catalyst be uniform throughout the reaction mass.

As fouling of the catalyst is greatly reduced by limiting its residence time in the reactor, removal of this contamination by oxidation in the regenerator is more easily effected and at considerably lower temperatures, eliminating to a great extent the possibility of damage to the catalyst by excessive temperatures normally existing during regeneration or caused by localized overheating.

Further objects and advantages of the invention will be apparent during the course of the following description in which the process has been applied to the cracking of hydrocarbon oils in the presence of a finely divided solid catalytic material such as natural or synthetic clay.

In the accompanying drawings which form a part of the instant specification and are to be read in conjunction therewith, Fig. 1 is a flow diagram of the process as applied to the cracking of hydrocarbon oils, Fig. 2 is a sectional view of the vapor contactor and regenerator, Fig. 3 is a view taken along the line 3—3 in Fig. 2 in the direction of the arrows, Fig. 4 is an enlarged detail of the impeller assembly.

As suggested heretofore the process will be described as applied to catalytic cracking but such disclosure is not to be read in a limiting sense since it is applicable as well to all types of catalytic chemical reactions in which fluids (gases or liquids) are contacted with a solid catalyst.

Referring to Fig. 1, which is a flow diagram of a catalytic cracking system, the hydrocarbons are fed to the system from any convenient source such as a storage tank shown at 10. The feed stock passes through pipe 11 and is discharged by means of pump 12 into a heater diagrammatically shown at 13. In the heater the feed stock is raised to a vaporizing temperature after which it is discharged through a transfer line 14 into the bottom of a fractionating tower 15. In the tower liquid is separated from the vapor constituent, the former being drawn off through pipe 16 and discharged by pump 17 through pipe 18 to storage or for treatment elsewhere. The vapor portion of the feed passes off from the top of the tower through line 19 and may be directed through pipe 20 to a mist extractor 21. By closing valve 22 and valve 23 and opening valve 24 in pipe 25, the mist extractor may be by-passed.

Vapors passing to the mist extractor are denuded of entrained liquid particles, the liquid passing out through draw-off line 26 regulated by valve 27 for recycling through pipes 28 and 14 to the fractionating tower. The vapors discharged from the top of the mist extractor pass through line 29 to heater 30. The temperature of the vapors in heater 30 is raised the desired amount to put the vapors in condition for further processing. By-pass line 31 and suitable valves 32, 33 and 34 offer means for by-passing the heater if desired. From heater 30 the hydrocarbon vapors are discharged through line 35 and are directed through a second mist extractor 36 which may be by-passed through line 37 by proper manipulation of valves. Liquid separated in mist extractor 36 is withdrawn through pipe 38 and may be recycled by pump 39 through pipe 40 to transfer line 14 or diverted from the system through cooler 41 and pipe 42. It is contemplated that the hydrocarbon charged to the reactor may be in the liquid phase in cases when there is sufficient heat available in the catalyst fed to the reactor to vaporize the charge.

The vapors now conditioned by removal of entrained liquid particles and the heavier ends pass through pipe 43 to line 44 which charges them into the contactor reactor 45. This reactor is similar in construction to the contactor regenerator shown at 46 and detailed in Fig. 2 of the drawings. The solid catalyst is supplied from a tank or bin 47 designated as new clay storage. This catalyst is withdrawn from storage 47 through pipe 48 and is passed through diagonal pipe 49 and mixed with the vapors in pipe 44. The mixture of vapors and catalyst flows into the vessel 45 and is there reacted as hereinafter described in connection with the explanation of the contactor.

The reacted vapor catalyst mix is discharged from contactor 45 through pipe 50 through which it passes to a separator 51 where the greater part of the solid material is separated from the vapor. An open steam connection 52 supplies steam to the separator for removing volatile hydrocarbons and purging the catalyst voids of hydrocarbon vapors. Catalyst removed from the vapor during the separating and stripping operation in 51 passes through pipe 53 to recycle clay storage 54. This storage tank has a return connection 55 through which used or unregenerated clay can be recycled through pipes 49 and 44 to the reactor or by closing valve 56 and opening valve 57 in pipe 58 the used clay is diverted to regenerator 46 through pipe 59. A connection 60 into the top of the spent clay storage tank 54 also communicates with the bottom of reactor 45 and may be used to exhaust catalyst from the reactor when the plant is shut down by introduction of gas or steam through pipe 61.

Following the vapor travel from the top of separator 51 the vapors pass through pipe 62 either directly to fractionation 63 through pipe 64 or by closing valve 65 and opening valve 66 in line 67, the vapors are passed through precipitator 68 where additional catalyst fines are extracted. This additional catalyst in a relatively fine state is returned from precipitator 68 through pipe 69 to the used catalyst storage 54. Vapors from the precipitator pass through pipe 70 to fractionation 63 through pipe 64. By-pass lines 71 and 72 controlled by suitable valves offer opportunity for by-passing the precipitator and diverting the vapors through heat exchange 73 prior to directing them to fractionation. In the fractionating equipment diagrammatically shown at 63 there is separated a fuel oil or recycle stream which passes off through pipe 74, a gasoline stream diverted through pipe 75 and unliquified gas through pipe 76. A part or all of the liquid bottoms separated out during fractionation containing catalyst fines may be recycled through pipe 77 to be introduced into the reactor through pipe 44. By closing valve 78 and opening valve 79 this recycle liquid or slurry containing catalyst fines not previously separated are recycled to separator 51 through pipes 77, 80 and 50.

Referring now to the catalyst regeneration used catalyst from storage 54 which is at substantially reactor temperature flows through pipes 55, 58 and 59 to regenerator 46. Air to burn off or consume by oxidation the accumulated carbon particles fouling the hot catalyst is introduced with the clay to the regenerator through pipe 59. Air supplied through pipe 81 is charged by compressor 82 to heater 83 through pipe 84. After heating the air is discharged through pipe 85 and is introduced to the regenerator through connecting pipe 59 for starting regenerator. The heater 83 may be by-passed through line 86 by manipulation of the valves 87, 88 and 89 during normal operation.

In the regenerator catalyst contamination is removed to the extent desired while circulating the stream of gas and catalyst through the vessel. The mixture from regenerator 46 passes through pipe 90 to a separator 91 where a greater part of the catalyst passes off from the bottom of the separator through pipe 92 to the regenerated clay storage tank 93. Steam may be introduced to separator 91 through pipe 94 to assist in the catalyst separation and purge the catalyst voids of combustion gases and air. Regenerated catalyst accumulated in storage 93 may be drawn off through pipe 95 and combined with fresh catalyst or with used catalyst which is being charged to the reactor through pipes 49 and 44. Valves in the draw-off lines from the separate catalyst storage tanks are used to control the amount of the different types of catalyst which is recycled. To exhaust catalyst from the regenerator when the system is not in operation air under pressure is supplied through pipe 96 and the catalyst conducted as a suspensoid in the air media through pipe 97 into the top of storage tank 93. Each of the clay storage tanks 47, 54 and 93 has vent lines 98. New clay storage tank 47 has a supply pipe 100 through which fresh clay is added.

The flue gas relieved of the greater part of regenerated catalyst passes from separator 91 through pipes 101 and 102 to a precipitator 103 in which additional fines are removed. The flue gas passes from the top of the precipitator through pipe 104 while the fines separated in precipitator 103 are drawn off through pipe 105, to be returned through line 106 to storage 93 or diverted from the system through pipe 107.

Before extracting the regenerated catalyst in separator 91 and the fines in precipitator 103 the flue gas catalyst mixture may be diverted through waste heat equipment designated diagrammatically at 108 and 109.

To clean the equipment either before or after operation steam may be introduced through pipes 110. Recycle gas may be introduced into the reactor and fuel gas to the regenerator for direct firing through lines 110. In order to remove accumulated material in both the reactor and regenerator air blasts may be injected through pipes 111.

Connected to the regenerator 46 by pipes 112 and 113 is a heat exchanger or boiler diagrammatically shown at 99. This boiler may be used as a temperature control device for the combustible gas catalyst mixture passing through the regenerator and may be built integral therewith instead of as a separate unit as shown. Fluid is supplied to the boiler through pipe 114 and discharged therefrom through pipe 115. A draw-off pipe 116 with a suitable valve is connected into the heat exchanger to divert catalyst should it be desired to do so.

A diversion pipe 117 is connected into the oil catalyst slurry line 78 for removing the slurry from the system instead of recirculating it to the reactor.

The reactor 45 and regenerator 46 are similar in design and the details of construction are shown in Figs. 2 to 4 of the drawing. To simplify the description, the device will be called a contactor. Its function in the system both as a reactor and regenerator is to thoroughly, intimately, and uniformly mix the solid catalyst particles throughout the gaseous medium in which they are suspended. It consists of a shell and circulation tube in which is positioned an impeller driven by a variable speed motor or other type of prime mover located at the top. The impeller circulates the suspensoid through and around the open ended tube at a relatively high rate of speed. The passageways formed by the circulation tube in the shell of the contactor, as well as the impeller and all related parts which in any way are associated with the fluid flow, are highly streamlined and designed to reduce insofar as possible friction, concentration of the heavier solid particles or eddying of the mixture.

The shell 118, the impeller head 119, and lower head 120 are held together by tie rods 121. Supports partially shown at 122 are arranged around the flange of the impeller head and serve as standards for the device. Above the impeller head are motor supports 123 which carry the motor enclosed within a casing 124. Motor shaft 125 is connected to the impeller shaft 126 by coupling 127. An enclosure 128 surrounding the shaft is flanged at the top and has a cover 129. Within this enclosure is a seal 130 which extends along the shaft preventing egress of the mixture from the shell. To cool and lubricate the seal circulating oil is supplied through pipe 131 and discharged through pipe 132. Oil is supplied to the motor bearings through pipes 133.

Within the shell of the contactor 118 is the open ended circulation tube 134 which is thickened at its ends to streamline the passageways formed with the upper and lower heads. Within the upper end of the tube and mounted on shaft 126 is an impeller 135 whose blades are shaped to obtain a maximum efficiency in moving the gas catalyst mixture. Below the impeller and depending into the central portion of the tube from the lower end of the impeller shaft and hub is a stationary member 136 which is fared to reduce to a minimum the resistance presented by the hub and shaft of the impeller. Supporting the member 136 within the tube are curved stationary vanes 137 which divert the direction of flow of the stream slightly in order that it enters the impeller with the least possible turbulence and in order to obtain the maximum driving effect of the rotating blades.

In the annular passageway formed in the impeller head around the upper end of the circulation tube is the upper splitter 138 which consists of a series of circular trough shaped members telescopically arranged but spaced apart by support members 139. A single splitter member 140 is positioned in the annular passageway formed in the lower head of the contactor where the gas catalyst mixture passes around the end of the circulation tube. The functions of these splitter members is to divide the stream and prevent concentration of the heavier solid particles during reversal of the flow of the stream and to reduce turbulence at the turns. It also reduces abrasion caused by turbulence.

The material to be mixed which in the reactor includes catalyst and reactant gases and in the regenerator catalyst and oxidizing gases are introduced at the bottom through a pipe designated by the numerals 44 and 59 to correspond to like numerals on the flow diagram in Fig. 1. Likewise the catalyst gas mixture discharged from the contactor flows out through the horizontal pipe tapped into the impeller head and designated by numbers 50 and 90 to correspond to the discharge lines from the reactor and regenerator in Fig. 1. To clean the shell and reactor an air blast may be introduced through pipes diametrically positioned in the lower part of the shell numbered 111.

In operation the mixture of catalyst and gas introduced at the bottom of the shell is drawn by the impeller up through the circulation tube 134 in a linear flow which is rapidly accelerated at the impeller and discharged through the passageway formed in the impeller head where the direction of flow is reversed and the mixture directed downwardly through the annular space between the circulation tube and the shell. Near the top and bottom of the shell and positioned radially in the annular space between the circulation tube and shell are a plurality of straightening vanes 141 which convert spiraling or turbulence in the flowing stream to linear movement.

By means of this device a thorough, complete and uniform dispersion of the catalyst through the gaseous medium with which it is circulated is obtained. Considerably more catalyst can be suspended in the gaseous medium by a positive independently driven impelling device than where energy to produce the mixture is furnished through the agency of the feed itself. Thus, there is offered considerably more surface to the reactants or combustible gas than is possible with fixed bed, or moving bed.

Particle size of the catalyst used will depend upon its weight and the velocity of the carrier medium, it being essential that conditions prevail in both the reacting and regenerating steps to assure complete mixing and uniform dispersion in order that a maximum surface of catalyst be exposed to the reactants and the greatest possible opportunity for elimination of fouling from the catalyst surface.

Heretofore mixing of catalyst with the reactants or regenerating gas was accomplished by passing the fluids through a static bed, counterflowing them with a moving bed or by contact with what is termed as a fluid mass of catalyst. This latter contact method employed or made application of the gas lift principle in which a downflowing stream of high solids density is balanced with an upflowing stream of gas of low solids density. This method commonly known as the "fluid catalyst" system of contact is subject to the disadvantages and short-comings of the static and moving bed method to perhaps a lesser degree insofar as availability of catalyst surface is concerned. Channelling, accessibility and availability of catalyst surface in the reactor and regenerator are in all methods dependent upon and functions of the solids feed rate, composition, particle size and vapor or gas velocity produced by the feed.

Purposely no mention has been made of the operating conditions of the catalytic cracking system described including character of the charging stock, temperature and pressure existing in the reactor, regenerator and separating stages, type of catalyst used or particle size of catalyst employed. Likewise, little or no importance has been given to the variety of different types of commercial processes to which the invention is adapted.

Conditions prevailing in each case will depend upon the particular method involved, the stocks treated and the results desired. Our invention pertains primarily to the effectiveness of mixing in stages of the process where thoroughness of mixing has a profound and critical influence upon the overall results obtained. It is designed to aid, improve and augment throughput, yield and quality of product while being an important factor in reducing capital, cost of equipment and operating expenses.

It is contemplated that multiple reactors may be used with a single regenerator or multiple regenerators with multiple reactors while maintaining independent control in each reactor of the catalyst reactant ratios and the catalyst conditions.

As many possible embodiments may be made of the invention without departing from the scope thereof, it is to be understood that all matter herein set forth or shown in the accompanying drawings is to be interpreted as illustrative and not in a limiting sense.

From the foregoing it will be seen that our invention is one well adapted to attain all of the ends and objects set forth, together with other advantages which are obvious and which are inherent to the process and apparatus described.

Having thus described our invention, we claim:

1. A process of reacting gaseous materials in the presence of a solid catalyst wherein a cyclic flow of the reactants and catalyst is maintained in the reaction step, said cyclic flow including upflowing and downflowing columns having a common axis, the improvement which resides in imparting mechanical rotative energy in the upper portion of the upflowing column whereby lineal flow of the reactants and catalyst is accelerated in the separate columns.

2. In a process of reconditioning solid catalytic material in the presence of a gaseous medium wherein a cyclic flow of gas and catalyst is maintained in a regenerating step, said cyclic flow including upflowing and downflowing columns having a common axis, the improvement which resides in imparting mechanical rotative energy in the upper portion of the upflowing column whereby lineal flow of the reactants and catalyst is accelerated in the separate columns.

CHARLES W. STRATFORD.
JOE A. ALTSHULER.
DAVID H. PUTNEY.

REFERENCES CITED

The following references are of record in the file of this patent:

UNITED STATES PATENTS

| Number | Name | Date |
|---|---|---|
| 1,984,380 | Odell | Dec. 18, 1934 |
| 2,231,424 | Huppke | Feb. 11, 1941 |
| 2,253,486 | Belchetz | Aug. 19, 1941 |
| 2,300,151 | Hemminger I | Oct. 27, 1942 |
| 2,300,152 | Hemminger II | Oct. 27, 1942 |
| 2,305,569 | Degnen | Dec. 15, 1942 |
| 2,307,879 | Cornell | Jan. 12, 1943 |
| 2,311,564 | Munday | Feb. 16, 1943 |
| 2,319,836 | Woerner | May 25, 1943 |
| 2,328,325 | Butikofer | Aug. 31, 1943 |
| 1,887,047 | Smith et al. | Nov. 8, 1932 |
| 1,988,541 | Christensen | Jan. 22, 1935 |
| 2,159,200 | Bleibtreu | May 23, 1939 |
| 2,228,131 | Watson | Jan. 7, 1941 |
| 2,326,705 | Thiele et al. | Aug. 10, 1943 |
| 2,337,684 | Scheineman | Dec. 28, 1943 |
| 2,341,193 | Scheineman | Feb. 8, 1944 |
| 2,347,682 | Gunness | May 2, 1944 |
| 2,347,747 | Melaven | May 2, 1944 |
| 2,354,546 | Reeves | July 25, 1944 |